B. C. TILGHMAN.
CUTTING STONE AND OTHER HARD SUBSTANCES.
No. 7,499. Reissued Feb. 6, 1877.
FIG. I
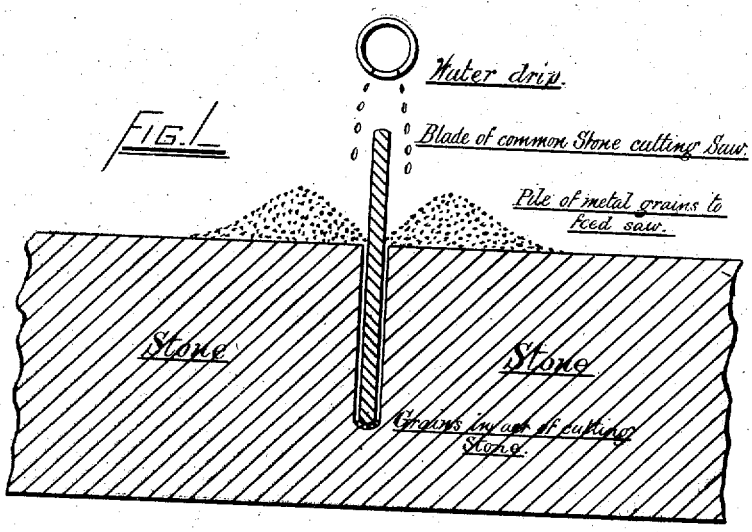
FIG. II
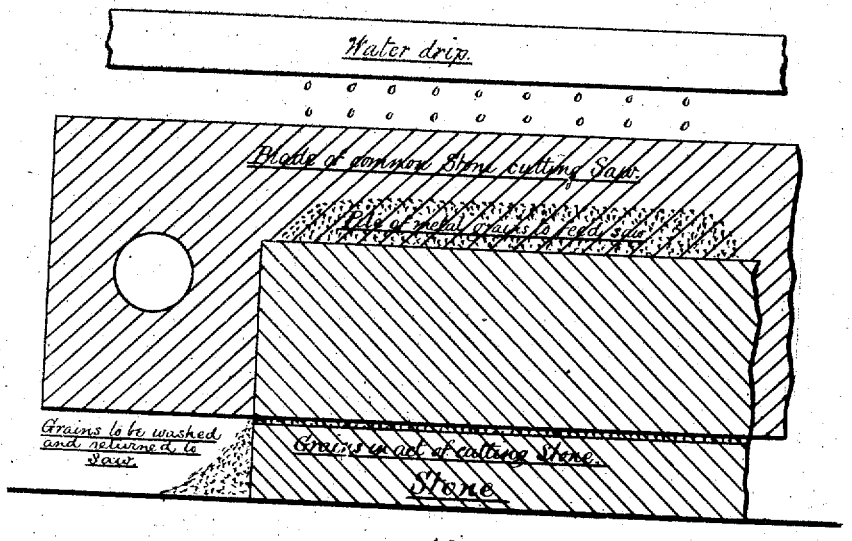
Witnesses
R. A. Tilghman
W. C. Brawbridge
B. C. Tilghman Inventor
By George Harding
Attorneys

UNITED STATES PATENT OFFICE.

BENJAMIN C. TILGHMAN, OF PHILADELPHIA, PENNSYLVANIA.

IMPROVEMENT IN CUTTING STONE AND OTHER HARD SUBSTANCES.

Specification forming part of Letters Patent No. 133,501, dated November 26, 1872; reissue No. 7,499, dated February 6, 1877; application filed December 20, 1876.

*To all whom it may concern:*

Be it known that I, BENJAMIN C. TILGHMAN, of Philadelphia, Pennsylvania, have invented certain Improvements in Cutting Hard Substances, of which the following is a specification:

My invention relates to the cutting, sawing, boring, and grinding of stone, glass, pottery, and similar hard substances by means of small grains or globules of metal of the nature, character, and mode of action hereinafter more particularly described, rubbed against them under pressure by a saw-blade or other tool in the same manner as is practiced with sand or emery.

I have discovered that grains or globules of cast-iron of the nature and character hereinafter described possess an efficient cutting or grinding power on stone, glass, &c., and on account of the cheapness of this material, and the facility with which it can be made into tough and hard grains, I prefer to use it in practice.

I have also discovered that if a globular or spheroidal form be given to small grains of iron or steel, or their alloys, their action as a material for sawing, cutting, or grinding stone, glass, &c., takes place on account of this globularity in a different, and, I believe, more advantageous, manner than when the grains are pointed, sharp, or angular, and that in proportion to the work done less power is required, and the wear of the saw-blade or rubbing-tool is less.

The globular grains of metal roll over and over under the rubbing pressure of the saw-blade or tool, and indent grooves into its softer material, while they crumble, crush, or pulverize the stone.

The pointed, sharp, or angular grains of metal tend rather to embed themselves into one of the rubbing-surfaces and to tear or scratch the other.

I have also discovered that when iron or steel, or their alloys, are subdivided in a melted state, the small grains or globules produced are suitable to be used as a cutting, sawing, and grinding material for stone, glass, &c. Generally considerable proportions of these grains are of a globular form, and they can be produced economically in large quantities.

I have also discovered that when iron or steel, or their alloys, are subdivided into grains or globules in a melted state, in such a manner that the grains become chill-hardened by rapid cooling, these grains have a greater efficiency as a cutting, sawing, and grinding material for stone, glass, &c.

The following is one method of carrying my invention into effect, taking, for example, the sawing of marble, sandstone, or granite with grains or globules of cast-iron made from melted metal and chill-hardened, and the kind of saws commonly known and used for sawing stone:

The grains are to be applied to the saw in the same manner as the sand commonly used, and are fed into the saw-kerf with small streams of water in the same way, so that a constant supply of them will be washed down, and will be caught and rubbed between the edge of the saw and the stone. The grains which escape from the kerf are collected and thrown back again to feed the saw. The supply of water should be sufficient to wash away the mud produced. The small pieces and powder of the worn and broken grains of metal may be separated from the mineral portion of the mud by known processes of washing, and may be sifted and reused for such grinding or polishing purposes as their size will suit, or they may be remelted. Magnets may be used to help the saving and separation of the iron from the mineral powder in a way which is well understood.

The iron grains, when suffered to remain in a damp state exposed to the air, are liable to rust and cement together, so as to form solid lumps or crusts, and I have discovered that if the water used on the saws is kept alkaline by lime or other alkali, the iron grains will be less apt to rust and cement together.

The grains can be used with various forms of reciprocating, circular, crown, or band saws, or with any other suitable known kind of sawing, boring, or rubbing machinery.

In drilling holes in rocks with the metal grains and a rotary drill, I have sometimes used a tubular or hollow tool, like a crownsaw, which will make an annular cut, leaving a central core to be afterward detached.

When boring a hole without a core, I use a solid tool pierced with a small hole near, but not at, the center.

The grains can be supplied by means of a stream of water forcibly driven through the central hole, and the mud and metallic fragments escape with the water around the outside of the drill-tool. By thus forcibly transporting and feeding the supply of grains by means of a current of water, saw-cuts or bore-holes can be made upward, downward, or horizontal.

The known machinery used for the diamond drills and saws may be applied to working with the metallic grains.

In certain cases a forced current of air may be used, instead of water, to transport the supply of grains to the cutting-surface, and to remove the débris and cool the tool.

To facilitate the supply and the washing away of the débris of stone and metal, I have found it useful, when the nature of the operation permits, to cause the tool to draw back from the work slightly and frequently, and to strike it again with a sliding blow, as is practiced in the ordinary process of sawing stone with sand.

When sawing stone with sand, or other abrasive materials which act chiefly by scratching, the wear of the saw-blades is so rapid that it is not found advantageous in practice to notch the blade of the frame-saws. Now, I have discovered that when the metallic grains or globules are used, which act chiefly by rolling and crushing, the wear of the saw-blade, in proportion to the depth of stone sawed, is, in the case of marble, less than one-half as much as when sand is used, and in case of granite, less than one-sixth as much as when sand is used.

In consequence of this greater durability of the saw-blades, I find it advantageous, for rapid sawing, to make notches in the blades of frame-saws, so as to assist in feeding the grains to the rubbing-surface, and I prefer to make such notches about one-half inch to one inch wide, and from four to eight inches apart.

The greater the speed and pressure of the rubbing, the faster will be the cutting; but, as economy in the consumption of the grains is an object, the pressure should be kept below that which will too rapidly break or crush them.

For general sawing, cutting, and grinding purposes, I have found grains or globules of about from one-hundredth ($\frac{1}{100}$) to one-twentieth ($\frac{1}{20}$) of an inch diameter to give good practical results; but I do not mean to confine myself thereto, and I intend to use both smaller and larger sizes wherever suitable.

The size of grains or globules most suitable, in view of the economy of time, power, and expense, will vary according to the object desired and the material operated on, and can only be ascertained by comparative trials. As a general rule it may be stated that small grains produce smoother and more polished surfaces, narrower saw-kerfs, and sharper lines and edges, and operate on hard stones with less pressure, while large grains, at suitable speed and pressure, cut faster into soft stone, make a wide saw-kerf, and leave a rougher surface.

I have obtained fair average results in sawing stone with roundish grains of about one thirty-fifth ($\frac{1}{35}$) to one forty-fifth ($\frac{1}{45}$) of an inch diameter.

For smoothing and polishing operations I use a series of grains, particles, or powders of gradually-increasing fineness up to the ultimate degree, as is practiced in working with sand and emery.

I have found wrought-iron to be a good material for the saws, drills, and other rubbing-tools; but where more convenient for the purpose intended, I have also used cast-iron, copper, stone, glass, wood, leather, and the other materials commonly used in the arts for grinding and rubbing with sand and emery. A very hard, close-grained material, like chilled cast-iron or hardened steel, does not answer well, as the grains tend to slip over it, whereas they ought to partly adhere to or indent themselves into the surface of the tool or rubber, so as to get sufficient hold or resistance to enable them, while sinking into the stone, glass, &c., to roll over or scratch into it.

The cutting, boring, sawing, and rubbing tools can be made of any suitable size and shape, so as to produce holes or plane or curved surfaces, or any kind of moldings or ornamental designs, and the proper rotary, reciprocating, or other movements can be given to the tools and to the articles operated on by suitable lathes, slide-rests, sawing, planing, boring, or rubbing machines, or other known kinds of machinery; and I do not mean to confine myself to or to claim in this patent any particular form or kind of tool or machine for operating with the metallic grains.

I have recommended cast-iron as the metal to be generally used, because tough and hard grains of a globular form can be made from it cheaply by dividing the metal in a melted state; but I do not confine myself thereto. I have also used grains made in a similar way from steel, and the various mixtures and alloys of iron and steel, with other metals which are known in the arts. Some of these are tougher and harder than cast-iron, but are also more expensive.

Various processes are known in the arts by which melted metals can be divided into small grains or globules. Flat or saucer-shaped disks revolving on vertical axes have been used, into which the melted metal is poured, and gets whirled outward and divided by the centrifugal force.

Scattering or atomizing a stream of melted metal by a jet of steam is another known method which I have used to make grains of cast-iron, and I prefer it in practice. The drops of metal should fall into water to cool and harden them.

By operating in a close box or chamber, the atmosphere of which has been deprived of its oxygen, the tendency of the drops of hot metal to burn may be prevented.

The grains should be sifted to sizes suitable for their intended use, and, if desired, those of globular shapes may be separated from those of more irregular shapes by rolling them down inclined planes, as is practiced in making lead shot.

Any known process of hardening or tempering may be applied to the grains, by which their toughness or hardness may be increased.

Having thus described my invention, I claim and desire to secure by Letters Patent of the United States—

1. The use of grains or globules made of iron, or cast-iron or steel, or their alloys, subdivided while melted, in the process of cutting, sawing, boring, and grinding stone, glass, pottery, and similar hard substances, substantially as above described.

2. The use of grains or globules made of iron, or cast-iron or steel, or their alloys, subdivided while melted, and of a rounded or spheroidal shape, so as to operate by a rolling crush in the process of cutting, sawing, boring, and grinding stone, glass, pottery, and similar hard substances, substantially as above described.

3. The use of grains or globules made of iron, or cast-iron or steel, or their alloys, and chill-hardened by cooling from a melted state in the process of cutting, sawing, boring, and grinding stone, glass, pottery, and similar hard substances, substantially as above described.

4. As a new article of manufacture, a cutting, grinding, or abrading material for stone, glass, pottery, and similar hard substances, consisting of grains or globules made of iron, or cast-iron or steel, or their alloys, subdivided while melted.

5. As a new article of manufacture, a cutting, grinding, or abrading material for stone, glass, pottery, and similar hard substances, consisting of grains or globules made of iron, or cast-iron or steel, or their alloys, subdivided while melted, and of a rounded or spheroidal shape, so as to operate by a rolling crush.

6. As a new article of manufacture, a cutting, grinding, or abrading material for stone, glass, pottery, and similar hard substances, consisting of grains or globules made of iron, or cast-iron or steel, or their alloys, and chill-hardened by cooling from a melted state.

7. The use of alkaline water in cutting, sawing, boring, and grinding of stone, glass, pottery, and similar hard substances by grains or globules of iron, or cast-iron or steel, or their alloys.

8. The use of notched blades for frame-saws in sawing stone and similar hard substances with grains or globules of iron, or cast-iron or steel, or their alloys.

B. C. TILGHMAN.

Witnesses:
R. A. TILGHMAN,
J. BONSALL TAYLOR.